United States Patent [19]

Vere et al.

[11] Patent Number: 4,700,824
[45] Date of Patent: Oct. 20, 1987

[54] MANUFACTURING INSTALLATION WITH SEVERAL FIXED WORK POSTS AND A HANDLING DEVICE

[75] Inventors: Bernard Vere, Eybens; Paul Mathevon, Bollene, both of France

[73] Assignee: Societe Cogema, Framatome et Uranium Pechiney, Velizy, France

[21] Appl. No.: 687,344

[22] Filed: Dec. 28, 1984

[30] Foreign Application Priority Data

Dec. 30, 1983 [FR] France .................... 83 21126

[51] Int. Cl.⁴ ............................. B65G 47/14
[52] U.S. Cl. ............. 198/346.2; 198/468.8; 376/261; 414/564; 414/672
[58] Field of Search ........... 414/222, 225, 564, 672, 414/662; 198/614, 468.8, 468.6, 346.2; 294/81.52, 67.32; 376/261, 264, 268–271

[56] References Cited

U.S. PATENT DOCUMENTS 2,975,882  3/1961  Abbey ....................... 414/564 X
3,658,197  4/1972  DiDonato .................... 414/564

FOREIGN PATENT DOCUMENTS

1161336  3/1958  France ....................... 414/744 R

Primary Examiner—Joseph E. Valenza
Assistant Examiner—Donald W. Underwood
Attorney, Agent, or Firm—Pollock, Vande Sande & Priddy

[57] ABSTRACT

A manufacturing installation having several fixed work stations and a handling device, said work stations being disposed along at least one handling bay. It further comprises a handling device having, on the one hand, an overhead transporter movable along the handling bay and having means for grasping, transporting and setting down a batch of a given number of objects and, on the other hand, at right angles to each work station, an intermediate take up and storage device having an upstream station for setting down by the transporter, a downstream station for taking up by the transporter and a conveyor capable of grasping the batch of objects as a whole at the upstream station, presenting the objects one by one at the work station and placing them as a whole in the downstream station, so as to completely decouple the operation of the transporter from each work station.

6 Claims, 15 Drawing Figures

MANUFACTURING INSTALLATION WITH SEVERAL FIXED WORK POSTS AND A HANDLING DEVICE

BACKGROUND AND SUMMARY OF THE INVENTION

The invention relates to a manufacturing installation of the type comprising several fixed work posts through which identical objects must successively pass during their manufacture. It is particularly suitable for use in the manufacture of nuclear fuel elements comprising an elongate sheath containing a stack of fuel material pellets and closed by plugs. However, it may also be used whenever the object to be processed has a general external shape which remains unchanged during manufacture and, especially, when it has an approximately elongate cylindrical shape.

When an object, during its manufacturue, is processed at several successive stations, it is current practice to provide, between these stations, a conveyor with buffer storage means for compensating the discontinuities in manufacture at each station. Such an installation is relatively "frozen" and does not readily lend itself to the transfer of some of the objects to particular positions, for example to a repair shop or a reject station, upon detection of a defect at a control station.

It is an object of the invention to provide a manufacturing installation having several work stations and an improved automatable handling device. It is a more particular object to provide sufficient intermediate storage for ensuring regularity of operation without requiring a complex handling device, and independence of operation of the different work stations and the handling means.

According to the invention, a manufacturing installation of the above-defined type has work stations disposed along at least one handling bay. The handling device comprises, on the open hand, an aerial transporter movable along the bay and having means for taking up, transporting and laying down a batch of a given number of objects and, on the other hand, at right angles to each work station, an intermediate storage and take up device having an upstream station for laying down by the transporter, a downstream station for taking up by the transporter and a conveyor capable of taking the batch of objects as a whole from the upstream station, presenting the objects one by one at the work station and placing them as a whole in the downstream station.

Thus, a totally a synchronous operation of the transporter of each work station is provided. It is sufficient for the transporter to be able to lay down (or take up) a complete batch from an intermediate storage device, providing that its laying down (or taking up) station is free (or totally occupied), whatever the advance of the work on the batch carried by the corresponding conveyor.

In the case (because it lends itself particularly well to the implementation of the invention) of an installation for manufacturing nuclear fuel rods, each intermediate storage device advantageously comprises a conveyor having several parallel endless belts with notches for receiving the rods at a pitch greater than the diameter of these latter and the upstream and downstream stations comprise parallel supports having notches at the same pitch as that of the belts, and are able to assume a high position above the conveyor for supporting the rods and a low position in which the rods rest on the conveyor. The overhead transporter may then comprising an overhead crane travelling along the bay having a vertically movable lifting beam and comprising keys insertable between rods for grasping these latter. Because of the reduced diameter of the rods, they may be easily grouped together in a large number (in batches of 24 for example), in the form of a layer having a reduced cross dimension.

Among the advantages of the above defined arrangement, is the possibility of adding or removing work stations in any number and at any position (since the transporter may cause the objects to follow a path comprising outgoing and return journeys), of modifying the sequence, and of providing several work stations operating in parallel so as to carry out operations longer than those performed at other work stations. Intermediate storage may be provided, after a checking operation for example, so as to wait for the result of this latter before continuing the manufacture. No turning over of the objects is required, since the work stations may be placed alternately on one side and on the other of the handling bay. Finally, the design and automation of the installation are facilitated by the identity of the storage and take up stations.

When the operations to be effected on the objects are numerous, the work stations may be spaced apart along two parallel bays each having a transporter, the passage of the objects from one bay to the other being provided by means of a traverser. The zones situated between two bays may be occupied by stations working on a single side or on both sides. Thus the longitudinal space required is reduced and additional zones may moreover be provided, more particularly storage zones. An additional traverser situated at the end of the bays may be provided for serving these additional zones.

BRIEF DESCRIPTION OF THE DRAWINGS

The invention will be better understood from reading the following description of an installation for manufacturing nuclear fuel rods for a pressurized water reactor, given solely by way of non limitative example, with reference to the accompanying drawings, in which.

DETAILED DESCRIPTION OF A PREFERRED EMBODIMENT

Figure 1:
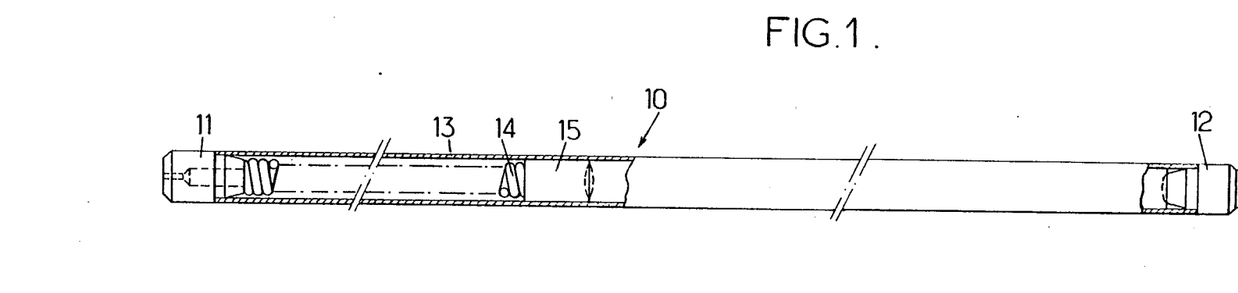
FIG. 1 is a longitudinal sectional view of a representative fuel rod.

The installation which will be described by way of example is intended more especially for manufacturing fuel rods 10 of the kind shown in FIG. 1. These rods comprises a metal sheath 13 formed by a tube of small diameter and great length closed by plugs 11 and 12. A stack of calibrated pellets 15 of uranium oxide, forming the fuel, is held pressed against the first plug 12, by a spring 14 which bears against the second plug 11. This plug 11 is pierced with a hole for pressurizing the sheaths when it is in place, whereafter this hole is sealed.

Figure 2:
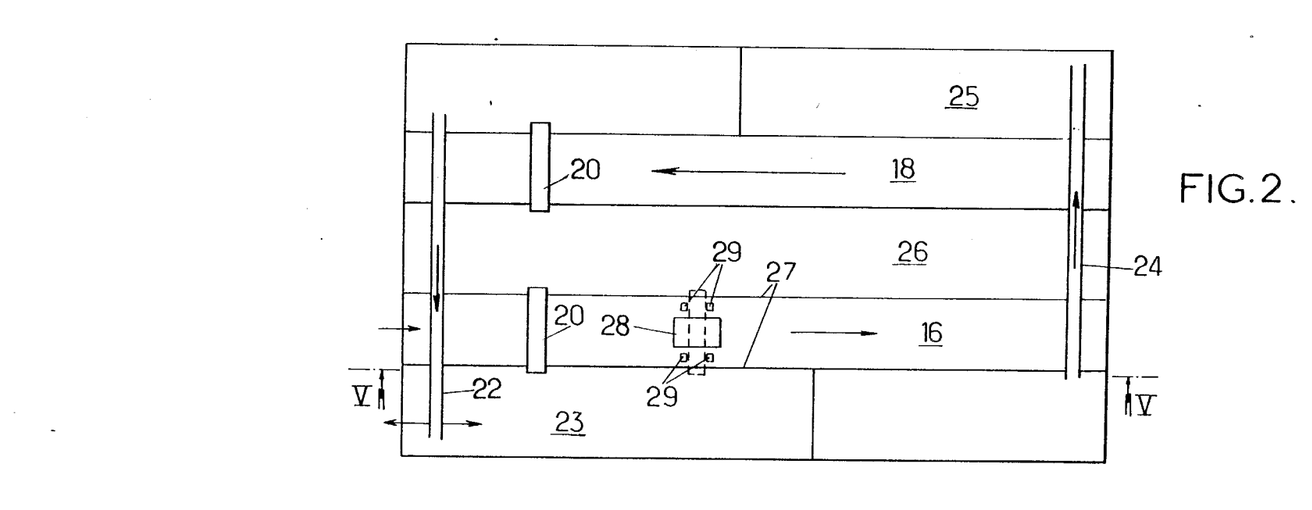
FIG. 2 is a very schematical top view showing the general arrangement of an installation having two parallel handling bays and two transporters.

The installation as shown schematically in FIG. 2 comprises two handling bays 16 and 18 each served by a transporter 20. Two traversers 22 and 24 are used for moving a batch of rods at the same time from one bay to the other, between two positions accessible by means of the overhead cranes forming overhead transporters. These traversers are also used, one for serving a final storage zone 3 and the other a buffer storage zone 25 each placed on one side of the set of bays. These zones only occupy a fraction of the length of the handling bays. The rest of the length of the lateral zones may form side manufacturing bays, occupied by work stations which are added to those occupying a central manufacturing bay 26.

The handling bays 16 and 18 are lined with beams 27 connecting gantries together and on which rest travelling rails. They are equipped with sets of fixed guides 29 resting on the ground, each set being at right angles to a fixed manufacturing station, this latter term designating a position where an operation is carried out which may be fitting, manufacturing or checking. A single one of these sets 29 is shown schematically in FIG. 2. The purpose of these sets of guides 29 is to provide the required accuracy of laying down and taking up a batch of sheaths or rods onto and from the intermediate storage device 28 associated with each work station.

Figure 3:
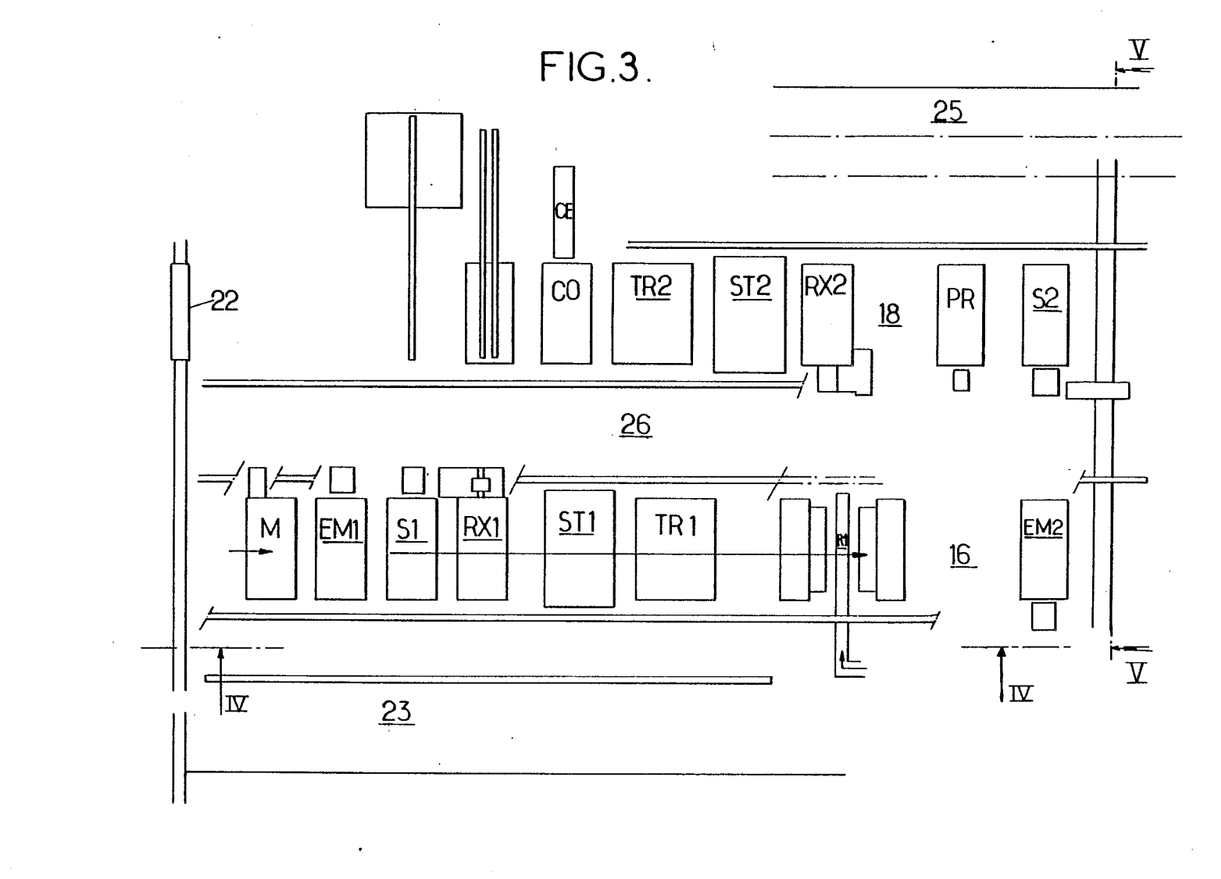
FIG. 3 is a top view of a particular installation according to the diagram of FIG. 2.
Figure 4:
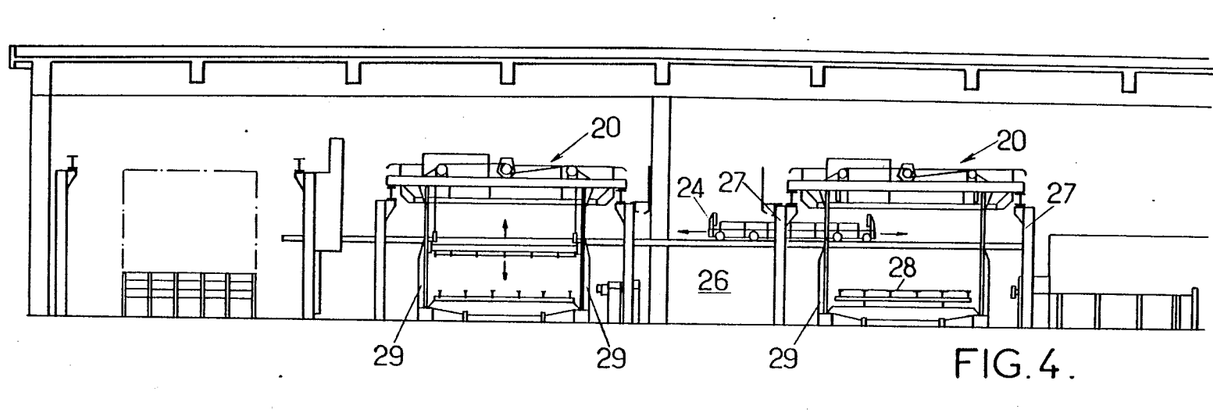
FIGS. 4 and 5 are respectively elevational views along lines IV—IV and V—V of FIG. 3.
Figure 5:
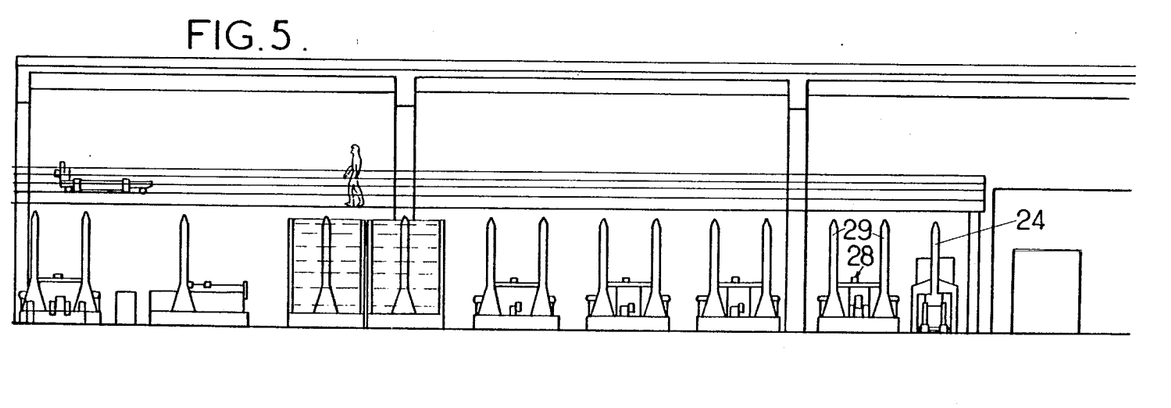

To illustrate a possible arrangement of the different work stations, FIG. 3 gives a top view of a distribution which may be adopted when the manufacture of the fuel rods comprises the following sequence of successive operations carried out when the sheaths or fuel rods occupy the zones indicated between brackets:

marking of the sheaths 13 (station M)

fitting of the first plug 12 in the sheath (station EM1), welding the plug 12 (station S1), X-ray checking of the welding of plug 12 (station RX1), storage (ST1), then visual checking for detecting defective parts and removal of same (TR1), insertion of the pellets 15 into the sheaths (station R1), fitting of the spring 14 and of the second plug 11 (station EM2);

transfer from one bay to the other by the traverser 24, welding of the second plug 11 (station S2), pressurization and sealing by welding (station PR), X-ray checking of the welding securing the second plug and sealing (station RX2), a further visual check and removal of the 3 rejected fuel rods (TR2), sealing check (station CO), enrichment check of the fuel and final check of the finished fuel rod (station CE).

The apparatus for carrying out the different functions may have any appropriate construction.

There will not be described, in succession, the components of the installation for bringing the fuel rods to the work position of the successive apparatus, namely:

the transporters movable along the handling bays, and the sets of fixed laying down and taking up guides.

Transporters

The two transporters 20 (FIGS. 5 to 9) are practically identical, so that only one will be described. They may be considered as being formed by a travelling overhead crane 30 with deck and a lifting bar 32. The travelling crane is equipped with two running bagies 34 resting on two fixed rails situated above beams 27. A motor driven reducer 35 mounted on the travelling overhead crane controls the driving wheels of bogies 34 simultaneously through two half shafts.

Figure 6:
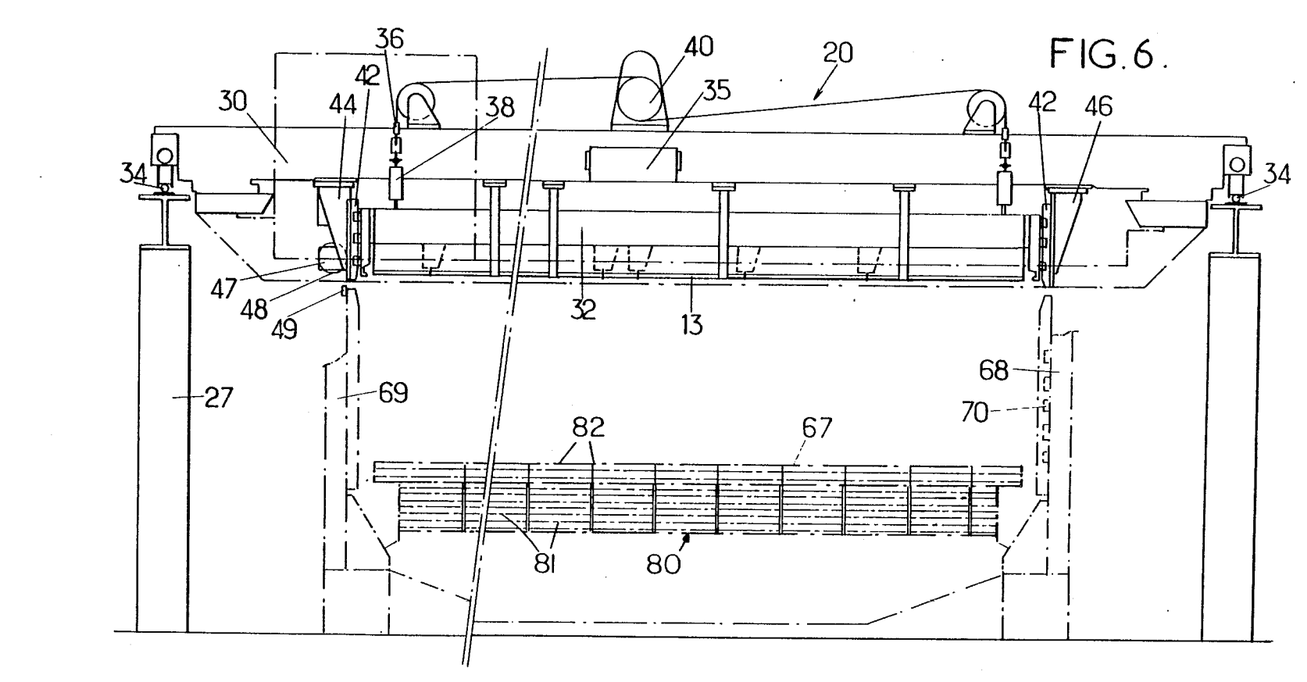
FIG. 6 is a simplified elevational view showing a transporter usable in the installation of FIGS. 2 to 5.
Figure 7:
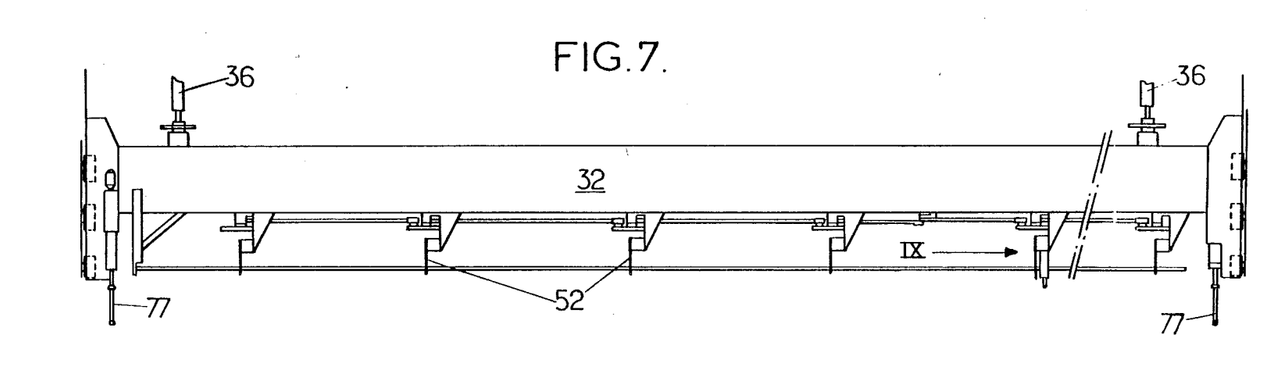
FIGS. 7 and 8 are elevational and top views, respectively, of the lifting bar of the transporter of FIG. 6.
Figure 8:
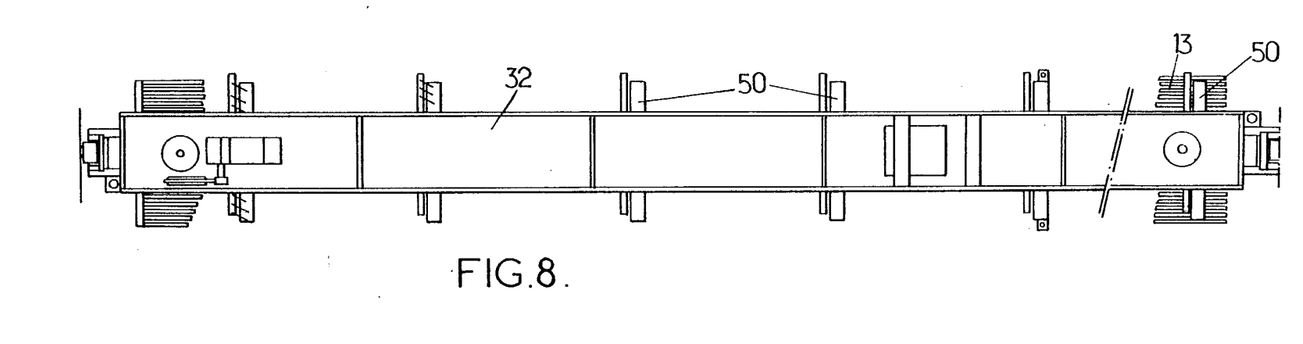

The lifting beam 32 is suspended above crane 30 by two cables 36 provided with shock absorbers and a force limiter 38. A set of pulleys mounted on the deck of the crane leads each cable to a winder situated at the end of a motor driven reducer 40 providing vertical movement of lifting bar 32. The ends of the lifting bar are provided with two vertical lateral guides 42 in the shape of a U which are engaged on rollers carried by jibs 44, 46 fixed under the deck of the crane. The roller train carried by jib 44 is not directly fixed to this jib. It is mounted on a horizontally movable frame 47, in a vertical plane perpendicular to the lifting beam, with respect to jib 44. This frame is guided and an independent motor 48 provides movement thereof for correcting errors in the stopping position of the corresponding end of the lifting beam 32.

It should be noted in this connection that the mass and dimensions of the transporter do not allow absolute rigidity and perfect guiding to be obtained. If, as will be seen further on, stopping of the travelling crane is controlled by a photoelectric cell mounted on jib 46, the end of the crane carrying jib 46 may in fact be stopped at a desired position, but the other endmay then be offset, making it necessary to realign the axis of the lifting beam 32 by moving the frame.

Figure 9:
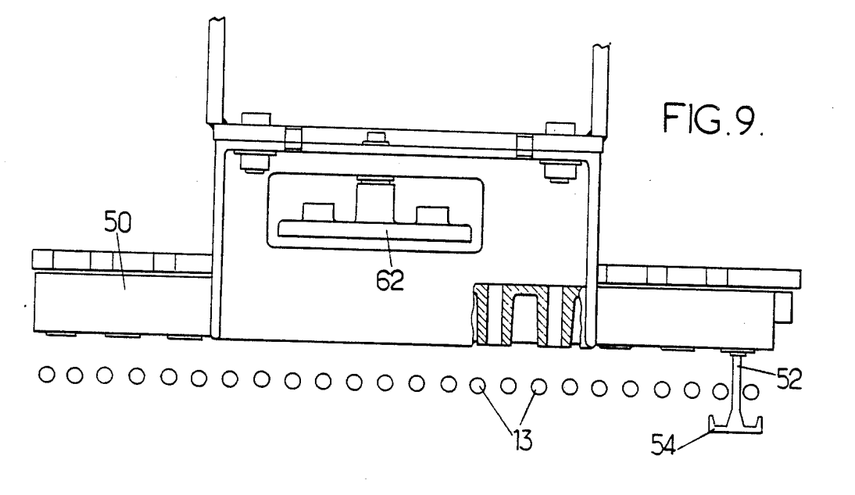
FIG. 9 is a detail view in the direction of arrow IX of FIG. 7.
Figure 10:
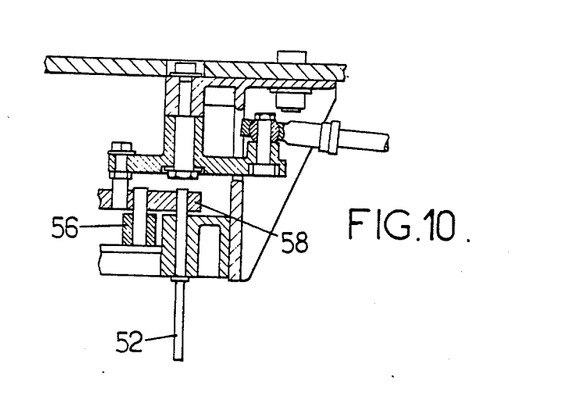
FIG. 10 is a detailed section view through a vertical line passing more especially through the axis of the control plate shown in FIG. 9.
Figure 11:
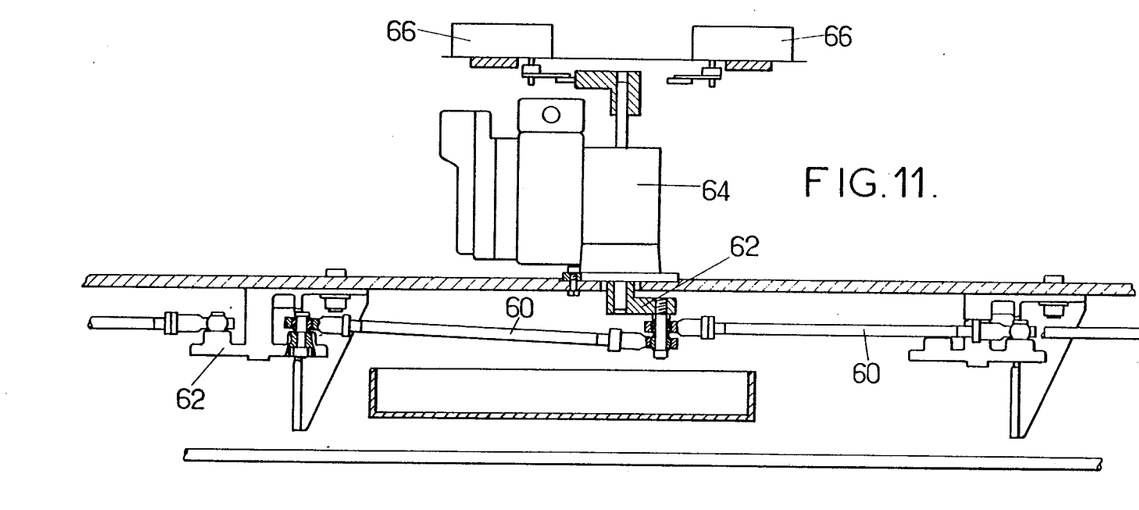
FIG. 11 is a section through a vertical plane transversal to a handling bay, showing a portion of the lifting bar of FIGS. 7 to 9, in order to show the control linkage of the keys.

The correct position may be defined by a system of two photoelectric cells 48 on frame 47 cooperating with two fixed pilot lights 49. The lower face of the lifting beam 32 supports a device for grasping the sheaths or fuel rods. This device comprises an assembly of parallel cross pieces 50 each equipped with a series of fingers 52 rotatable about a vertical axis each carrying a key with two opposite hooks 54 (FIG. 9). A mechanism for rotating fingers 52 comprises mobile cross pieces 56 (FIG. 10) which drive a pivoting arm 58 through a linkabe 60 (FIG. 11) actuating rotary plates 62 connected to the mobile cross pieces. One of plates 62 is connected to a motor 64 which each time causes the plates to rotate through 90° so as to cause the simultaneous rotation of the assembly of keys, also through 90°. Limitation to 90° of the change of orientation for each actuation may be provided by means of contactors 66 cooperating with a finger driven by motors 64 (FIG. 11). Thus, actuation of motor 64 causes fingers 52 to rotate through 90° and the hooks to be placed in the take up position once the keys 54 have been inserted in a layer of sheaths or fuel rods supported by a rack so as to allow the lifting beam to raise the layer. Further actuation causes a layer of cranes to be abandoned after they have been laid down and then the lifting beam be freed.

The transporter is also provided with a landing device which cooperates with the fixed guides and will be described after them.

Fixed guides

Each of the fixed laying down and taking up guides may be regarded as comprising a rack table 67 forming an inteface with the corresponding storage device 28 and two uprights 68, 69 enclosing the handling bay. The uprights each support a vertical row of rollers 70 only some of which have been shown. These rollers ensure guiding of the lifting beam 32 in its downward movement by the engagement of the two slides 42 on the rollers 70. Upright 58 has at the top a fixed pilot light which cooperates with a cell on the crane for controlling the stopping of this latter. Upright 74 has the two fixed pilot lights 49 which, through the two cells on the mobile frame 47 of the jib 44, provides axial realigning of the lifting beam until its slide 42 is vertically positioned with respect to the row of rollers 70 of upright 74.

Table 67 is equipped with a laying down rack having positions for receiving a layer of sheaths or fuel rods spaced apart with the same pitch as the series of keys of the lifting beam. The storage device associated with this table and with a second table offset in the direction of the bay causes each sheath to be successively presented to the work post or removed therefrom.

Figure 14:
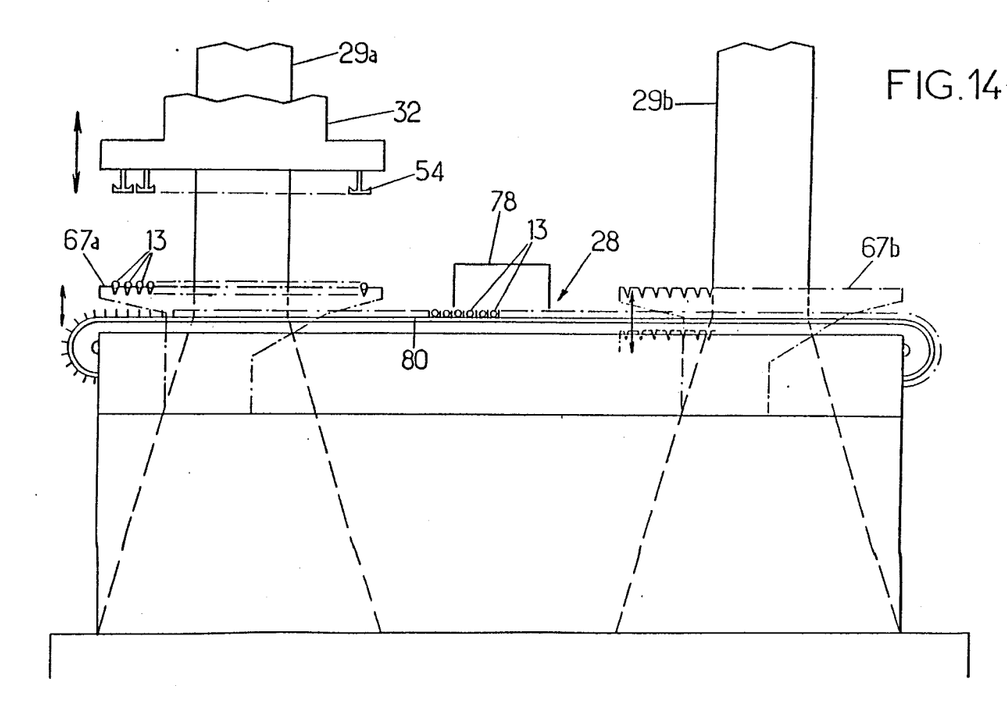
FIG. 14 shows schematically, in elevation, a general storage device belonging to the installation.

By way of example, FIG. 14 shows very schematically a possible arrangement of a storage device for completely decoupling handling along the bay by means of transporter 20 and the presentation of each sheath or fuel rod in its turn at the work station. For that, with each apparatus intended to carry out an operation on the sheath or fuel rod, shown at 78, there is associated a work station placed opposite. This work station is surrounded, in the longitudinal direction, by an upstream station for laying down by transporter 20 and a downstream station for taking up by the transporter. Each of these stations comprises a rack, 67a at the first station, 67b at the second. This rack is surrounded transversely by two guides, 29a in the first case, 29b in the second. Each rack is movable vertically between a top position in which it is shown in FIG. 14, and a bottom position (shown in broken lines in the figure). When the rack is in the top position, it may receive sheaths or fuel rods 13 by lowering the lifting beam 32 carrying a layer of sheaths or fuel rods, rotating keys 54 and raising the lifting beam. When the rack is in the low position, it releases the sheaths or fuel rods which it lays on a conveyor 80 having studs spaced apart at the same pitch as the notches of the rack 67a. Referring to FIG. 6, the rack 67 and the conveyor 80 are obviously in the form of longitudinal belts 81 and 82, having a width and spacing such that they may interfit one in the other. The rack may be constructed and operated as described in French Patent Application No. 83 21125 (U.S. Ser. No. 687,228).

With this arrangement, it is possible for the conveyor to receive a layer of sheaths or fuel rods, then to move them until it has freed them from the rack. The rack may then be raised. It is again ready to receive a layer of sheaths or fuel rods. The same goes for rack 67b, which ensures complete decoupling between the storage function and the function for presenting successive sheaths or fuel rods at the work station, which is achieved by advancing conveyor 80 step by step.

For the sake of safety during engagement of the slides on the train of rollers of jibs 44, 46 or on that of uprights 68, 69, the slides are provided with a flexible coating chamfered on the input and output side. In addition, the first rollers of the jibs and of the uprights may be given a diameter slightly less than that of the others.

Device for engaging the transporter on the fixed guides

This device, already mentioned, has two functions:
a shock absorbing function, when laying down on the bases of the fixed take up or laying down guides; and
a function for reducing the speed of and stopping the lifting beam at the top and bottom positions when this latter is engaged by its lateral guides in the sets of rollers carried by jibs 44, 46 of the crane and by uprights 68 and 69.

Figure 12:
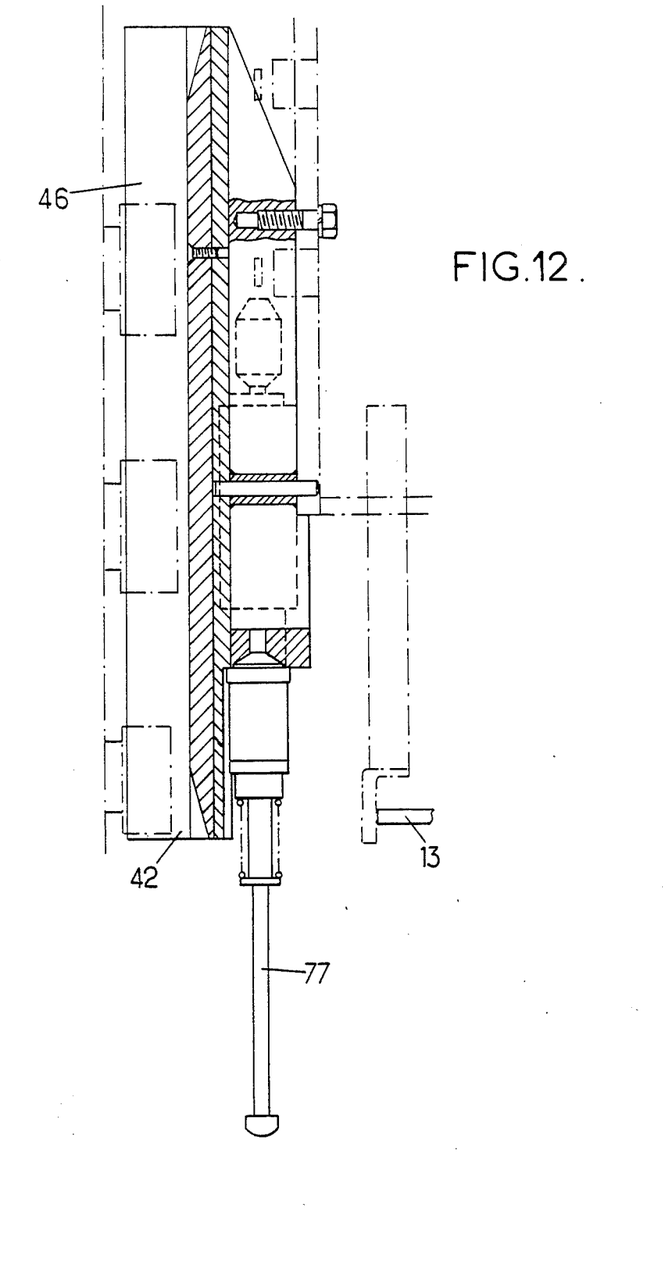
FIG. 12 is an enlarged section view through a vertical plane passing through the axis of one of the shock absorbing rods of the lifting bar of FIG. 7 to 9.

The shock absorbing function is ensured by the engagement of two feelers carried at the end of rods 77 (FIG. 12) having resilient washer braking shock absorbers.

Figure 13A:
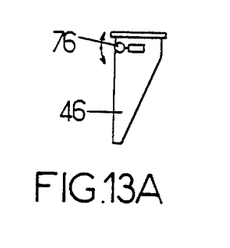
FIGS. 13A and 13B are diagrams showing the arrangement of the speed increasing and reducing contactors on one of the jibs of the transporter crane of FIG. 6, respectively from left to right.
Figure 13B:
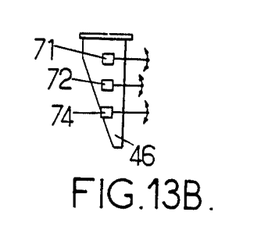

The speed reduction function comes into play during the downward movement, when the lifting beam approaches its lower stop position, and during the rising movement when the lifting beam reaches its top position. In the first case, the speed reduction may be provided by a device mounted on each upright 68, 69 which comprises two cam contactors, the first reducing the downward speed, the second causing the lifting beam to stop. In the second case, the slowing down, as well as the increase in speed after a given travelling distance, are controlled by finger contactors mounted in steps on jib 46 of the crane. Three of the contactors 71, 72 and 74 are placed on one side of jib 46 (FIG. 13B). Contactor 71 is mounted in a circuit for reducing the upward speed, the second, 72, for increasing the downward speed, the third, 74, for causing stopping in the top position. A fourth contactor 76 mounted on the other side of the jib (FIG. 13A) it is intended to allow recentering of the crane by means of the mobile frame only when it is closed, when the lifting beam is in the top position.

The operation of the installation which has just been described is clear from its construction. The sheaths, then the fuel rods, follow the path indicated by the arrows in FIG. 1. A batch of sheaths in the form of a layer is first grasped by the conveyor of bay 16. The conveyor carries this layer, which may for example comprise twenty-four sheaths, to the marking station M. After all the sheaths have been marked, the transporter takes up the layer of marked sheaths and places them on the rack table of the station EM1 for fitting the plugs. After all the sheaths have been treated, the layer is taken up again by the transporter and passes through the next stations. However, some operations require considerable storage time; this is for example the case for the radiographic check in station RX1. It is in fact necessary to develop the negatives, then to examine them. For this reason, a dynamic intermediate storage station S1 is provided having two laying down and take up posts served by the transporter. Dynamic storage with seven horizontal beds of laying tables, each retractable by translation for having access to all the stored sheaths, will be generally satisfactory. The sorting table TR1 which follows the storage allows the defective sheaths to be removed manually and to be replaced. This sorting table may comprise three successive stations, the first being reserved solely for laying down, a second for taking up, the third for taking up and setting down in a repair shop.

It can be seen that it is thus possible, by using the sorting table TR1 and the transporter:

to remove the refused sheaths detected by the radiographic check to the repair shop by the transporter and then the traverser 24, and to supply repaired sheaths in the reverse direction from the workshop.

This possibility of transferring sheaths from and to the work shop by means of the transporter (this possibility being possibly extended to the second bay because this latter is also equipped with dynamic storage ST2) allows the sheath to operate continuously without being depending on possible rejections of sheaths or fuel rods following checks.

After the first storage and first sorting, the layers of sheaths are taken up by the transporter and brought to the next station, i.e., the filling station R1. This station and the three succeeding ones require an operation on the end of the sheaths or fuel rods opposite the one treated up to then. Because of the relative arrangement adopted for the handling bays and for the manufacturing bays, this operation on one end, then on the other, is possible without turning the sheaths around.

Once all the operations are finished, the fuel rods may be placed in a storage station before being brought to an additional workshop where manufacture of the complete assemblies is carried out.

What is claimed is:

1. A manufacturing installation comprising a plurality of work stations for successively processing identical objects having a general external elongate shape with remains unchanged during manufacture, wherein said work stations are disposed along at least one handling bay and said installation comprises a handling device having
   (a) an overhead transporter movable along the handling bay and having means for engaging, transporting and laying down a predetermined plurality of said objects at a time; and
   (b) an intermediate take-up and storage device confronting each of said work stations, having an upstream station for receiving said objects laid down by the transporter, a downstream station for receiving said objects to be taken up by the transporter, said upstream station and downstream station being at a fixed position along the direction of the movement of said transporter and located under the path of said transporter along the bay, and conveyor means arranged for grasping said plurality of objects as a whole at the upstream station, presenting the objects one by one at the work station and presenting them as a whole at said downstream station, said upstream and downstream stations being vertically movable, so as to completely uncouple the operation of the transporter from each work station.

2. An installation for manufacturing nuclear fuel elements, comprising a plurality of fixed work stations through which sheaths of said element successively travel during manufacture thereof, wherein the work stations are disposed along at least one handling bay, and a handling device comprising
   (a) an overhead transporter movable along the bay and having means for grasping, transporting and laying down a predetermined number of sheaths as a horizontal layer; and
   (b) an intermediate take-up and storage device confronting each of said work stations, having an upstream station for receiving said plurality of sheaths laid down by the transporter, a downstream station for receiving a layer of said plurality of sheaths to be taken up by the transporter, said upstream station and downstream station being at fixed position along the direction of movement of said transporter and located on the path of the transporter along the bay, and conveyor means capable of grapsing the layer of sheaths as a whole in the upstream station, presenting the sheaths one by one at the work station and presenting them as a whole at the downstream station, said upstream and downstream stations being vertically movable.

3. An installation according to claim 2, wherein each intermediate storage device comprises a conveyor having several parallel endless belts having notches for receiving the sheaths at a pitch greater than the diameter of said sheaths and the upstream and downstream stations comprise parallel supports having notches at the same spacing pitch as that of the belts and capable of taking-up a high position above the conveyor for supporting the sheaths or fuel rods and low position in which the sheaths or fuel rods rest on the conveyor.

4. An installation according to claim 3, wherein the transporter has an overhead crane travelling along the bay, with a vertically movable lifting beam conprising keys insertable between the sheaths for grasping all sheaths in said layer simultaneously.

5. An installation according to claim 2, comprising at least two parallel bays and having traversers, for transferring a batch of said fuel rods as a whole from one bay to the other.

6. An installation according to claim 2, further comprising apparatuses operating on the fuel rods disposed on each side of the bay.

* * * * *